(No Model.)
J. B. BAYNES.
VEHICLE SPRING.
No. 368,371. Patented Aug. 16, 1887.
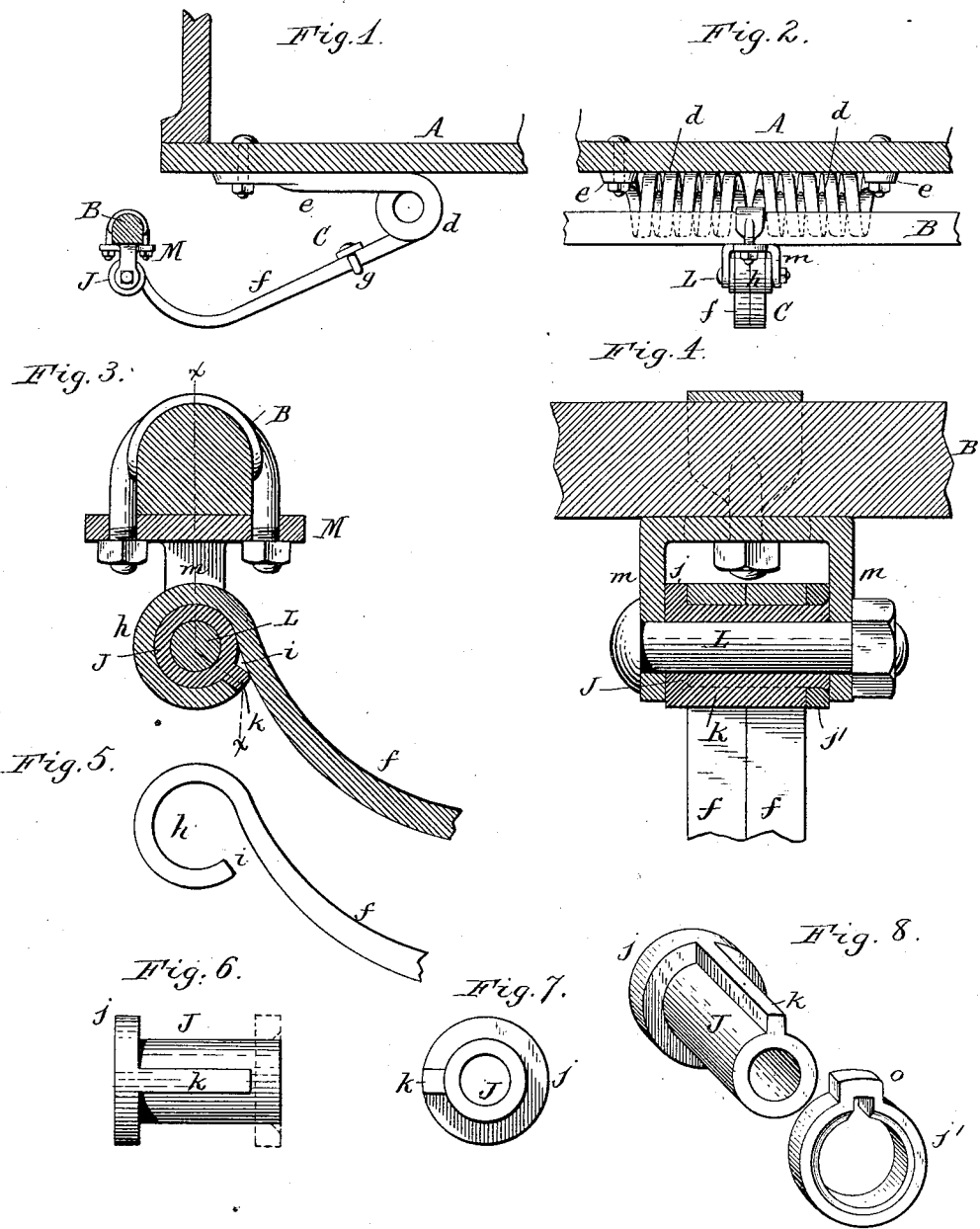
Witnesses:
Theodore L. Popp
Geo. J. Buchheit Jr.
James B. Baynes Inventor.
By Wilhelm Bonner
Attorneys.

UNITED STATES PATENT OFFICE.

JAMES B. BAYNES, OF BUFFALO, NEW YORK.

VEHICLE-SPRING.

SPECIFICATION forming part of Letters Patent No. 368,371, dated August 16, 1887.

Application filed April 30, 1887. Serial No. 236,617. (No model.)

*To all whom it may concern:*

Be it known that I, JAMES B. BAYNES, of the city of Buffalo, in the county of Erie and State of New York, have invented new and useful Improvements in Vehicle-Springs, of which the following is a specification.

This invention relates more particularly to an improvement in the bushing employed in vehicle-springs for connecting the ends of the spring-arms together, and which receive the clip-bolts whereby the springs are secured to the vehicle.

The object of my invention is to avoid the wear and rattling of the bushing in its socket and to improve the construction of the spring in this respect.

The invention consists, to that end, of the improvements which will be hereinafter fully described, and pointed out in the claims.

In the accompanying drawings, Figure 1 is a side elevation of a vehicle-spring provided with my improvement. Fig. 2 is an end view thereof. Fig. 3 is a fragmentary longitudinal section of the end of a spring provided with my improvement, on an enlarged scale. Fig. 4 is a vertical section in line $x$ $x$, Fig. 3. Fig. 5 is a fragmentary side elevation of the end of a spring. Fig. 6 is a side elevation of the bushing. Fig. 7 is an end elevation thereof. Fig. 8 is a perspective view of a modified form of the bushing.

Like letters of reference refer to like parts in the several figures.

A represents a portion of the vehicle-body; B, one of the side bars; C, one of the springs which connect the vehicle-body with the side bars. Two springs, C, are preferably arranged on each side of the vehicle-body for connecting the opposite sides of the vehicle-body with the side bars.

The springs C are each composed of two spiral coils, $d$, formed preferably from separate pieces of steel and arranged in line with each other, each coil being provided with an outer arm, $e$, which is secured to the vehicle-body, and an inner spring-arm, $f$, attached to the side bar. The inner arms, $f$, of the two adjacent coils are arranged side by side and connected together near the coils by a clip, $g$.

$h$ represents an eye or socket formed at the outer end of each arm $f$, and provided with a slot or opening, $i$. The eye $h$ is formed by bending the end of the spring-arm around a suitable mandrel, and the slot or opening $i$ is formed by leaving an open space between the extreme end of the arm and its bent portion, as shown in Fig. 5.

J represents the bushing, which is seated in the eyes $h$ of the two adjacent arms $f$, and whereby the outer ends of the two arms are firmly secured together. The bushing consists of a hollow sleeve, preferably made of brass, and provided at one end with a projecting collar or shoulder, $j$, which is formed with the sleeve, and a loose collar or washer, $j'$, which fits over the opposite end of the sleeve. The outer side of the collar or washer $j$ is preferably beveled around the inner edge, so as to permit the edge of the bushing to be upset or bent over against the beveled edge of the washer to firmly secure the latter to the bushing and draw the eyes of both spring-arms together.

$k$ represents a projecting rib formed on the outer surface of the bushing and extending lengthwise between the opposite ends of the bushing. The rib $k$ fits snugly in the slot or opening $i$, and prevents the bushing from turning in the eyes and wearing loose.

L represents the clip-bolt, which is inserted through the bushing and through the lugs $m$ $m$ of the clip M, attached to the side bars, and whereby the arms $f$ of the springs are connected with the side bars. Upon inserting the bushing through the eyes or sockets $h$ of two adjacent spring-arms and securing the washer $j'$ in place, the outer ends of both spring-arms are held firmly together and the bushing is held from turning in the eyes by the rib $k$.

By securing the bushing in the eyes of the spring-arms in this manner, the bushing is prevented from wearing loose and rattling.

If desired, the rib $k$ may extend the entire length of the bushing, and the washer $j'$ be provided with an enlargement, $o$, which fits over the end of the sleeve and the rib, as shown in Fig. 8.

I claim as my invention—

1. In a vehicle-spring, the combination, with the spring-arm provided at its end with an eye, $h$, having a slot, $i$, of a bushing, J, seated in the eye and provided with a projecting rib engaging in the slot of the eye, whereby the bushing is held from turning in the eye, substantially as set forth.

2. The combination, with the spring-arms $f$ $f$, provided at their ends with eyes $h$, having a slot, $i$, of a sleeve or bushing, J, extending through the eyes and provided with a projecting rib, $k$, engaging in the slot $i$ of the eyes, a shoulder, $j$, formed on one end of the bushing, and a washer, $j'$, adapted to fit over the opposite end of the bushing, whereby the bushing is secured in place and held from turning in the eyes, substantially as set forth.

Witness my hand this 23d day of April, 1887.

JAMES B. BAYNES.

Witnesses:
 JNO. J. BONNER,
 CARL F. GEYER.